J. J. McVETY & O. R. EMERSON.
DIRIGIBLE HEADLIGHT.
APPLICATION FILED NOV. 17, 1913.
1,168,526.
Patented Jan. 18, 1916.
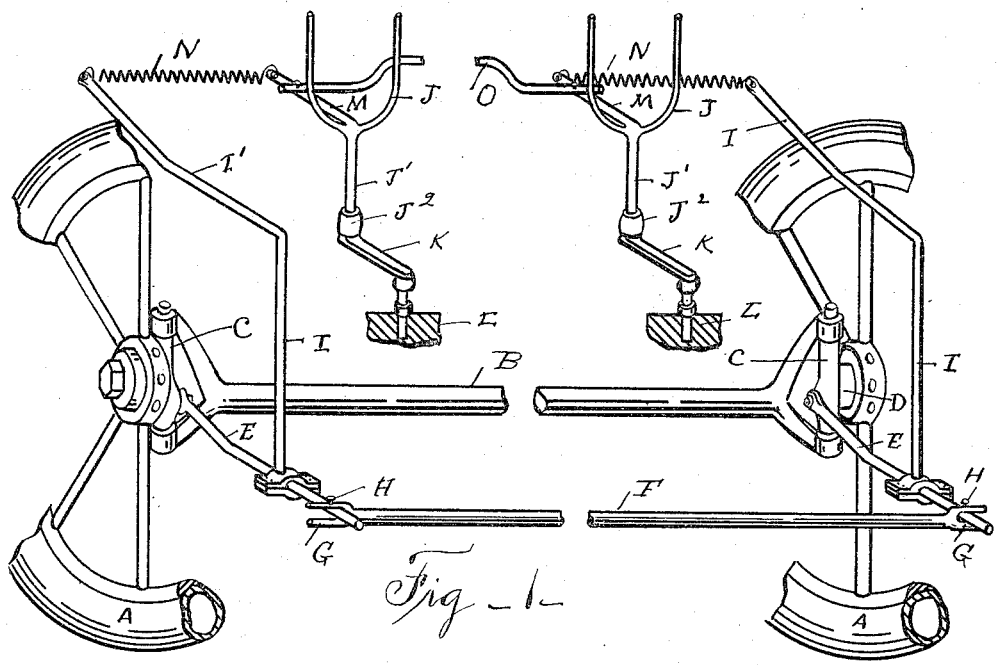
Fig. 1.
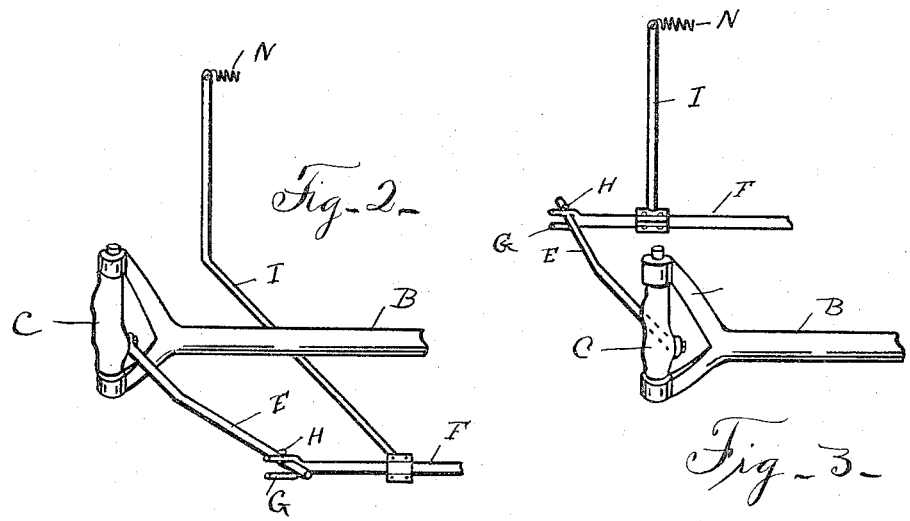
Fig. 2.
Fig. 3.
WITNESSES
Mary C. Page
Charles L. Foster
INVENTORS
Joseph J. McVety
Oscar R. Emerson
by Clifford Berret Clifford
Attorneys
THE COLUMBIA PLANOGRAPH CO., WASHINGTON, D. C.

UNITED STATES PATENT OFFICE.

JOSEPH J. McVETY AND OSCAR R. EMERSON, OF NEWPORT, MAINE.

DIRIGIBLE HEADLIGHT.

1,168,526.  Specification of Letters Patent.  Patented Jan. 18, 1916.

Application filed November 17, 1913. Serial No. 801,329.

*To all whom it may concern:*

Be it known that we, JOSEPH J. McVETY and OSCAR R. EMERSON, both citizens of the United States, and residents of Newport, in the county of Penobscot and State of Maine, have invented certain new and useful Improvements in Dirigible Headlights, of which the following is a specification.

This invention relates to improvements in dirigible lamps for automobiles and other vehicles.

Its object is to provide means for causing the lamps to rotate automatically in time with the forward wheels and independently of the body of the vehicle, so that the rays of light will always be reflected in the direction of movement of the forward wheels, whereby the road is front of the machine is always properly lighted, even in rounding curves.

A further important object of this invention is to prevent the jar which would result from rigid connections between the parts. To this end the lamp holders are rotatably mounted in brackets secured to the spring supported body of the machine, and are operable by means of mechanism mounted upon the running rigging, in which mechanism is comprised a coil spring.

In the drawing herewith accompanying and making a part of this application, Figure 1 is a perspective view of so much of an automobile as is necessary to show the application of the invention thereto, the view being taken from the seat; Fig. 2 is a detail perspective view showing a different application of the invention; and Fig. 3 is a detail perspective view showing still another application of the invention applicable to vehicles in which the steering gear connecting rod is located in front of the forward axle.

Same reference characters indicate like parts in the several figures.

In said drawing A designates a front wheel of an automobile; B the supporting axle bar; C a rotatable post mounted in the forked end of bar B, to which the short axle D of the front wheel is attached and also the steering knuckle E which supports the steering gear connecting rod F in any convenient manner, a convenient form being shown, wherein the end of the bar F is forked, as seen at G, to receive the end of the knuckle E, and the two are pivotally connected by means of a pivot pin H.

Set on some part of the steering gear, as knuckle E, is a vertical arm I which, at a suitable height, is bent forwardly to a substantially horizontal position to form a lever arm I', the said horizontal part being likewise bent somewhat toward the center of the machine, as shown, to correspond with a similar bent portion of the knuckle E. The forked lamp holder J has a post J' rotatable in a bracket K mounted upon some part of the body of the machine, as seen at J². At or near the bottom of the forked portion of the lamp holder is a projecting arm M located as convenience requires, and the end of lever arm I' is connected to the end of the arm M by means of a coil spring N. The two arms M, one on each lamp holder, are joined by a connecting rod O pivotally attached thereto. In Fig. 2 the lamp operating arm I is shown mounted upon the steering gear connecting rod F and extending longitudinally forwardly under the forward axle and then bent to vertical position. In Fig. 3, the arm I is mounted upon the steering gear connecting rod which is located in front of the forward axle and the lamp operating arm I is merely an upright mounted on said connecting rod F.

In operation, the turning movement of the forward wheels is communicated to the lamp holders through the connecting mechanism, so that the light is always reflected in the same direction as the wheels are pointed. Any abrupt motion of the lamp holders is prevented by the coil springs and all shock due to the fact that the lamp holders are mounted on the spring supported part of the machine and the lamp operating mechanism is mounted upon the running rigging is also prevented by the coil springs.

It will be understood that inasmuch as the mechanism on one side of the machine is the duplicate of that on the other side, only one side has been described. It will also be understood that the invention may be used with one or two lights, as desired.

Having thus described our invention and its use, we claim:

1. In a device of the character described, a vehicle body, a steering knuckle, a lamp holder mounted on said vehicle body and rotatable independently thereof, a horizontal crank on said lamp holder and means for rotating said lamp holder comprising an arm operated by said knuckle and extending upwardly to the plane of the lamp holder crank and a horizontal universally resilient connection directly between the upper end of said arm and the crank.

2. In a device of the character described, a vehicle body, a bent steering knuckle, a lamp holder mounted on said vehicle body and rotatable independently thereof, a horizontal crank on said lamp holder and means for operating said lamp holder comprising a vertical arm mounted on said knuckle and having a horizontal portion bent parallel with said knuckle and lying in the plane of said lamp operating crank and a horizontal universally resilient connection directly between said bent arm and said crank.

JOSEPH J. McVETY.
OSCAR R. EMERSON.

Witnesses:
F. W. HOLLIDAY,
HARRY A. FRIEND.

Copies of this patent may be obtained for five cents each, by addressing the "Commissioner of Patents, Washington, D. C."